3,789,018
SURFACTANT IN PREPARING SOLID CATALYSIS
Leon B. Levy and George Cyrus Allen, Corpus Christi, Tex., assignors to Celanese Corporation, New York, N.Y.
No Drawing. Filed Aug. 30, 1971, Ser. No. 176,336
Int. Cl. B01j 11/32
U.S. Cl. 252—439                              4 Claims

ABSTRACT OF THE DISCLOSURE

The preparation of solid catalysts containing such additives as metal tellurides, useful in oxidation processes for olefin conversions, wherein said catalysts are prepared by methods which include dispersing solid catalyst components in a dispersing medium and removal of the medium from the solids while they are being mixed or after mixing, is improved by the addition of a surface active agent in the mixture to promote blending and improve the resulting catalyst.

BACKGROUND OF THE INVENTION

Field of the invention

This invention relates to methods for the preparation of solid catalysts and more particularly to the preparation of solid catalysts in the presence of a surface active agent.

DESCRIPTION OF THE PRIOR ART

Solid catalysts, which are useful in many areas, can be prepared by methods which include dispersion of the solid components of the solid catalyst in a dispersing medium such as water, followed by removal as by vaporization of the medium away from the solids while they are being mixed. Solid catalysts of this type are useful as catalysts in such areas as procedures for the conversion of olefins to unsaturated aldehydes and unsaturated acids. A well known reaction of this type is the oxidation of an olefin such as propylene to form acrolein and acrylic acid. Various solid catalysts may be used to promote this reaction.

Certain catalysts of this type can be prepared by blending or dispersing in water or other dispersing medium the components of the catalyst and while the solid components were being mixed, the medium is vaporized away. It has been found, however, that when one or more of the solid components is not sufficiently wetted by the water it resists incorporation into the wet mixture and prevents formation of a homogeneous mixture. Accordingly, a need remains in the art for methods by which substantially complete mixing of the components of the solid catalyst may be achieved. The method of the present invention provides such an advance in the art.

SUMMARY OF THE INVENTION

It is according to one object of the present invention to provide procedures which overcome or otherwise mitigate these problems of the prior art.

A further object of this invention is to provide procedures for the preparation of solid catalysts for use in oxidation processes.

A still further object of the invention is to provide a procedure for the preparation of solid catalysts which include the use of a surface active agent in the preparative procedure.

Other objects and advantages of the present invention will become apparent as the description thereof proceeds.

In satisfaction of the foregoing objects and advantages, the present invention provides a process for the preparation of solid catalysts which comprises dispersing the components of said solid catalyst in a dispersing medium in the presence of a surface active agent and removing the dispersing medium from the solid component mixture while they are being mixed.

DESCRIPTION OF PREFERRED EMBODIMENTS

The present invention provides a procedure which improves the preparation of solid catalysts by providing a method whereby substantially complete mixing and blending of the solid catalytic components employed can be achieved in forming the catalyst. According to this invention, this is achieved by the incorporation of a surface active agent in the mixture during the blending process. It has been found that employment of the surface active agent overcomes the difficulties generally encountered when one or more of the solid components is not sufficiently wetted by the water and, therefore, resists incorporation into the mixture. Incorporation of a small quantity of a surfactant into the catalyst slurry being blended has been found to result in the rapid formation of a more homogeneous mixture and unexpectedly, a more active catalyst.

The process of the invention has general applicability to the preparation of solid catalysts and specifically in the preparation of solid catalysts useful for the oxidation of olefins to unsaturated aldehydes and unsaturated acids. It is with respect to the latter reaction that it was unexpectedly discovered that the catalysts prepared with the incorporation of a surface active agent in the mixture during blending provided unobvious and unexpected advantages in the oxidation process particularly for the conversion of propylene to acrolein and acrylic acid in that the conversion and yields were substantially increased.

Solid catalytic materials to which the method of the present invention is applicable include those which are prepared by the general procedure of dispersing solid components of the catalysts in a dispersing medium followed by removal as by vaporization of the medium such as by heating, the medium removal taking place while or after the solids are being blended. Specific types of catalysts which may be prepared in this way include catalytic mixtures of compounds of cobalt, molybdenum, bismuth, tungsten, and particularly these components with a small amount of tellurium or compound of tellurium. Typical components of this type include cobalt molybdate, cuprous telluride, bismuth telluride, tellurium dioxide, etc. and the like. Highly preferred catalysts of this type and for this reaction include a mixture of bismuth telluride and cobalt molybdate, cobalt molybdate and cuprous telluride and cobalt molybdate and tellurium dioxide. The invention is considered applicable, however, to preparation of other solid catalysts such as the solid phthalocyanines.

As pointed out above, the method of the present invention is useful in preparing catalysts which utilize the general procedure of forming physical mixtures of solids. A convenient method of obtaining such physical mixtures of solids is to disperse the solids in any type of dispersing medium such as water or an organic solvent, but preferably water, and then evaporating off the liquid medium while mixing the solid components. Often in this procedure at least one or more of the solid components will not be sufficiently wetted by the dispersing medium and will not mix satisfactorily during the blending procedure. Usually the component or components which has not been sufficiently wetted will float to the surface of the mixture and as a result, at least a portion thereof will not be blended into the catalyst being formed.

According to this invention, it has been found that incoporation of a small amount of a surface active agent into the dispersing medium during the blending procedure results in wetting of all the components present and formation of a more homogeneous mixture and unexpectedly, a more active catalyst. The amount of surface active agent which should be incorporated into the mixture to achieve the advantages of the present invention is very small and in many cases amounts only to a few drops, for example from about 1 to 10 drops or in small scale preparations, only millidrops should be used. It may be stated, therefore, that the amount of surfactant to be included in the mixture during the dispersion procedure should range from about 0.001 up to .01 weight percent, although any amount of surfactant outside this range can also be used providing the effects of this invention are achieved.

The class of surfactants to be used in the process of the present invention are well known in the art and in fact may be any of the well known nonionic, anionic, cationic surface active agents well known to the prior art.

As examples of anionic surfactants which may be employed in practicing the process of the present invention, there may be mentioned the alkali metal, preferably sodium or potassium alkaline earth metal, preferably calcium or magnesium, ammonium and amine, preferably mono-, di- or triethanolamine salts of:

sulfate esters of alkanols of 12–14 carbon atoms such as lauryl sulfate and myristyl sulfate;
sulfate esters or phosphate mono- or diesters of surfactants produced by condensation of an alkylene oxide (preferably ethylene oxide, although propylene oxide or butylene oxide or mixtures thereof may be used) with an alkanol of 8–18 carbon atoms or an alkyl phenol having an alkyl group or groups of 6–24 carbon atoms;
alkyl benzene sulfonic acids, such as dodecyl benzene sulfonic acid, both highly branched chain dodecyl benzene sulfonic acid obtained by alkylation with branch chained olefins such as propylene tetramer, and linear dodecyl benzene sulfonic acid obtained by alkylation with a linear of olefin of 12 carbon atoms;
higher fatty acid esters of hydroxy alkane sulfonic acids, such as coconut oil fatty acid esters of isethionic acid, the oleic acid ester of isethionic acid, etc.;
higher fatty acid amides of primary and secondary amino alkane carboxylic and sulfonic acids, such as oleic acid amide of sarcosine, coconut oil fatty acid amide of taurine, coconut oil fatty acid amide of N-methyltaurine, oleic acid amide of N-methyltaurine, palmitic acid amide of N-methyltaurine, etc.;
higher alkyl (12–18 carbon atoms) esters of sulfoacetic acid, such as the lauryl ester of sulfoacetic acid;
N-higher alkyl sulfo-succinamic acid, such as N-octadecyl-succinamic acid; and,
dialkyl esters of sulfosuccinic acid, such as dioctylsulfo-succinic acid.

Suitable nonionic surface active agents are as follows:
The polyglycol ethers of higher aliphatic alcohols (8–18 and preferably 12–18 carbon atoms) and of alkyl phenols (having 6–24 alkyl carbon atoms) which are obtained by condensing an alkylene oxide of 2–4 carbon atoms with the alcohol or alkyl phenol. Specific examples of such polyglycol ethers include the following condensates (in which E.O., Pr.O. and Bu.O. designate that the alkylene oxide employed was ethylene-oxide, propylene-oxide or butylene-oxide respectively, while the numeral preceding the designation of the oxide denotes the molar proportions of such oxide condensed with 1 molar proportion of the alcohol or alkyl phenol):

lauryl alcohol plus 6 E.O.
oleyl alcohol plus 8 E.O.
Stearyl alcohol plus 9 E.O.
Alfol 12 plus 6 E.O.
Alfol 1012 plus 6 E.O.
secondary straight chain (14 carbon atom average) synthetic alcohol:

plus 7 E.O.
plus 9 E.O.
plus 12 E.O.
oleyl alcohol plus 2 Pr.O. plus 9 E.O.
nonyl phenol plus 8 E.O.
nonyl phenol plus 15 E.O.
nonyl phenol plus 3 Pr.O. plus 8 E.O.
dodecyl phenol plus 12 E.O.
dinonyl phenol plus 18 E.O.
n-octyl phenol plus 9 E.O.
n-octyl phenol plus 10 E.O.
linear decyl phenol plus 15 E.O.
nonyl phenol plus 3 Pr.O. plus 15 E.O.
nonyl phenol plus 2 Bu.O. plus 12 E.O.

alkanolamides of fatty acids such as monoethanolamide, diethanolamide, and triethanolamide of:

coconut fatty acids
lauric acid
myristic acid
cetyl, lauryl, myristyl- and stearyl- dimethyl amine oxide.

As examples of suitable amphoteric surfactants (which are anionic under alkaline conditions and cationic under acid conditions) there may be mentioned:

water soluble salts, e.g. the sodium, potassium, ammonium and triethanolamine salts of—

N-lauryl beta amino propionic acid,
N-myristyl beta amino propionic acid,
N-tallow acid beta-amino dipropionic acid,
N-lauryl beta-iminodipropionic acid,
N-lauryl aminobutyric acid,
lauryl sulfonic acid betaine,
myristyl sulfonic acid betaine, and
cetyl sulfonic acid betaine.

As examples of cationic surfactants there may be mentioned the quaternary ammonium type surfactants such as:

stearyl dimethyl benzyl ammonium chloride,
lauryl dimethyl benzyl ammonium chloride,
distearyl dimethyl ammonium chloride,
lauryl isoquinolinium chloride,
lauryl pyridinium chloride.

A very highly preferred class of such surface active agents include the nonionic, cationic and anionic alkylaryl polyether alcohols and sulfonates sold by the Rohm & Haas Company under the tradename Triton. An especially preferred material of this type is the surface active agent sold as Triton–100.

As pointed out above, it has been found that the use of surface active agents to achieve a homogeneous mixture are particularly applicable for the preparation of certain solid catalysts. An especially preferred area in which such catalysts may be utilized, is in the conversion of olefins to unsaturated aldehydes and unsaturated carboxylic acids. In special areas, olefins of about 3 to 5 carbon atoms are oxidized in the presence of molecular oxygen from any convenient source such as air or mixtures of oxygen with other inert gases and in the presence of solid catalytic components as described herein. Water is also introduced into the reaction, preferably in the form of steam. The oxidation reaction results in the formation of a mixture of the unsaturated aldehyde and unsaturated carboxylic acid. A highly preferred reaction of this type is the oxidation of propylene to form acrolein and acrylic acid as these components find wide use in the ultimate formation of acrylate resins by well known procedures. This reaction is generally carried out at a temperature of about 250–550° C. and preferably under a pressure of about .5 to 10 atmospheres. During the reaction, contact times on the order of about 0.1 to 15 seconds are utilized.

It has unexpectedly been found, however, that the yield of desired products when the reaction is conducted in the presence of solid catalyst can be improved when catalysts prepared by the processes of the present invention are utilized. Thus, it has been found that conversions and yields are substantially improved when a catalyst prepared in the presence of a surfactant is employed as opposed to use of the same catalyst in the same reaction prepared without a surfactant. Therefore, this provides an unexpected advantage of the process of the present invention.

The following examples are presented to illustrate the method of the invention, but it is not to be considered as limited thereto. In the following examples parts are by weight unless otherwise specified.

Example I

Solid cobalt molybdate (30.0 grams) was ground together with 0.15 gram of bismuth tritelluride using 25 cc. of water as the dispersing medium. After grinding, the bismuth tritelluride floated to the surface of the slurry because it was not sufficiently wetted by the water present. Then the motar in which the mixture had been ground was placed in an oven at 115° C. to evaporate the water. The resulting solid was the calcined at 400° C. for 16 hours in the presence of air and screened to —20 to +30 mesh size.

Thus, this example represents preparation of a solid catalyst in the absence of a surface active agent.

Example II

In this example, 30.0 grams of cobalt molybdate were mixed together with 0.15 gram of bismuth telluride in the presence of 100 cc. of water with rapid blending. In this procedure two to three microdrops of Rohm & Haas Triton–100 surfactant were added to the mixture. When blending was complete, it was noted that the bismuth telluride had not separated out of the slurry by floating to the surface as in Example I. This solid was then dried at 115° C. to evaporate the water and calcined at 400° C. for 16 hours in the presence of air and screened to —20 to +30 mesh as in Example I.

Example III

In this example, 30.0 grams of cobalt molybdate were blended with 0.15 gram of tellurium dioxide in 100 cc. of water with two drops of Triton–100 as the surfactant. When blending was complete it was noted that none of the components had floated to the top of the surface. This catalyst was then dried by heating at 115° C. to evaporate the water and then calcined by heating at 400° C. for 16 hours in the presence of air and screened to —20 to +30 mesh size.

Example IV

In this example, the vapor phase catalytic oxidation of propylene was carried out employing as the catalyst that produced in Example I, i.e., the catalyst produced without the presence of a surface active agent.

In this example, propylene was oxidized in the vapor phase to produce essentially acrolein and acrylic acid. The reaction was conducted in the presence of air as the source of molecular oxygen using a reaction temperature of 400° C. The catalyst was 6.1 grams of the catalyst of Example I. i.e., a solid catalyst consisting of cobalt molybdate and bismuth tritelluride having a specific surface area of 17.0 and a total surface area of 103.70. Contact time for the components over the catalyst was 1.82 seconds and the mesh size of the catalyst was —20 to +30. The feed rate in liters/min. (NTP) for the propylene was 0.0136, for the air, 0.194, and for the water introduced into the system as steam, 0.122, representing a molar ratio of oxygen to propylene of 3:1.

The results of this experiment showed a propylene conversion of about 49 percent with an acrolein yield of 5.2 percent and an acrylic acid yield of 11.5 percent.

Example V

In this example, the reaction of Example IV was substantially repeated except the catalyst was that produced in Example II. Thus, this catalyst composition was one comprising cobalt, molybdenum and bismuth telluride prepared with a surfactant. In this example, the catalyst weight was 8.7 grams and the contact time was 1.798 seconds representing slightly varied conditions from Example IV. The feed rate in liters/min. (NTP) of propylene was 0.137, for air, 0.198 and for steam, 0.122, representing a molar ratio of oxygen to propylene fed into the system of 3.04:1. The results of this experiment indicated that a propylene conversion of 86.3 percent was achieved providing an acrolein yield of 3.5 percent, but a substantially increased acrylic acid yield of 30.7 percent. Therefore, in this experiment the substantial increase in activity of the catalyst is clear especially when considered together with the ease of the formation of the catalyst.

The invention has been described herein with reference to certain preferred embodiments. However, it is to be understood that as obvious variations thereon will occur to those skilled in the art, it is not to be considered as limited thereto.

What is claimed is:

1. A process for the preparation of a solid catalyst which comprises: dispersing cobalt molybdate and bismuth telluride or tellurium dioxide in water in the presence of an alkylaryl polyether alcohol surface active agent in an amount sufficient to bring about wetting of said cobalt molybdate and bismuth telluride or tellurium dioxide by said water; removing said water from the resulting dispersion while it is being mixed; and drying and calcining the resulting mixture.

2. The process of claim 1 wherein the surface active agent is incorporated into the dispersion in an amount of about 0.001 to 0.01 weight percent.

3. The process of claim 1 wherein said calcination is conducted at a temperature of about 200–600° C. in the presence of an oxygen-containing gas.

4. A catalyst prepared by the process of claim 1.

References Cited

UNITED STATES PATENTS

| | | | |
|---|---|---|---|
| 3,060,132 | 10/1962 | Weeks et al. | 252—429 B |
| 3,332,887 | 7/1967 | Endler | 252—430 XR |
| 3,240,806 | 3/1966 | Bethell et al. | 252—439 XR |
| 3,527,716 | 9/1970 | Nemec et al. | 252—439 |

PATRICK P. GARVIN, Primary Examiner

U.S. Cl. X.R.

252—430; 260—533N, 604 R